United States Patent
Durham et al.

(10) Patent No.: US 7,330,118 B2
(45) Date of Patent: Feb. 12, 2008

(54) APPARATUS AND METHOD CAPABLE OF SECURE WIRELESS CONFIGURATION AND PROVISIONING

(75) Inventors: Lenitra M. Durham, Hillsboro, OR (US); Scott D. Hahn, Beaverton, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/977,831

(22) Filed: Oct. 28, 2004

(65) Prior Publication Data

US 2006/0091196 A1 May 4, 2006

(51) Int. Cl.
*G08B 13/14* (2006.01)
(52) U.S. Cl. .............................. 340/572.1; 340/572.4; 340/568.1; 340/10.1
(58) Field of Classification Search ............. 340/572.1, 340/572.2, 572.4, 572.8, 572.9, 568.1, 10.1, 340/10.3, 10.31; 455/41.1, 41.2, 41.3
See application file for complete search history.

(56) References Cited

U.S. PATENT DOCUMENTS

| | | | | |
|---|---|---|---|---|
| 5,629,981 A | * | 5/1997 | Nerlikar | 713/168 |
| 6,677,852 B1 | * | 1/2004 | Landt | 340/10.1 |
| 6,967,577 B2 | * | 11/2005 | Taylor et al. | 340/572.1 |
| 6,978,118 B2 | * | 12/2005 | Vesikivi et al. | 455/41.1 |
| 7,053,775 B2 | * | 5/2006 | Moore | 340/572.1 |

* cited by examiner

*Primary Examiner*—Van T. Trieu
(74) *Attorney, Agent, or Firm*—James S. Finn; Intel Corporation

(57) ABSTRACT

An embodiment of the present invention provides an apparatus, comprising an RFID tag interfaced with the apparatus, the RFID tag enables wireless provisioning and configuration of the apparatus and may be a passive read/write RFID tag. The apparatus may be, in one embodiment, a platform such as a client or server and the passive RFID tag may be interfaced with the platform such that the tag's EEPROM can also be read from or written to by the platform using a wired serial connection. The apparatus may further comprise a host processor with an operating system (OS) and an embedded microcontroller, the embedded microcontroller may have access to dynamic and non-volatile memory capable of operating independently of the host processor and OS and with direct access to a network interface, wherein the RFID tag may be read from or written to by either a RFID reader or the platform via a direct connection to the embedded processor.

39 Claims, 3 Drawing Sheets

APPARATUS AND METHOD CAPABLE OF SECURE WIRELESS CONFIGURATION AND PROVISIONING

BACKGROUND

In various platforms, such as but not limited to, servers or clients that may need to communicate with other devices, secure communications may be vital. Secure communications may require encrypted communications and verification of devices; this may require, in an exemplary method, programmatic writing of PXE server addresses and cryptography keys by an IT administrator who may manually enter such information. This existing technique may require powering up of the platform and increase the chance for human error.

Thus, a strong need exists for an apparatus and method capable of secure wireless platform provisioning.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
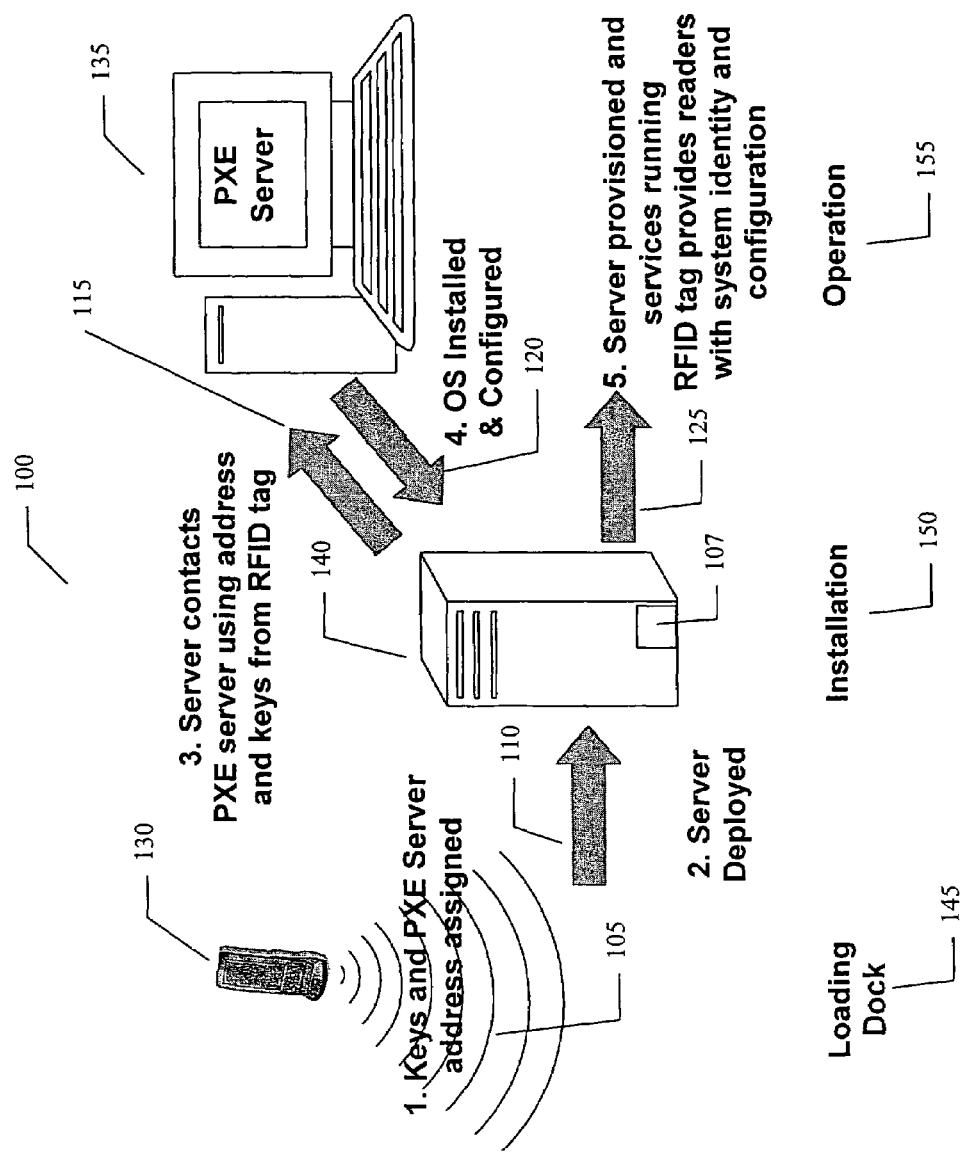
FIG. 1 illustrates the process enabling device configuration using an embodiment of the present.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read-only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

Although not limited in this respect, radio Frequency Identification (RFID) may refer to technologies that may use radio waves to identify objects. RFID systems may provide non-contact, non-line-of-sight identification. RFID systems may utilize three components, an antenna or coil, a transceiver (with decoder), and a transponder (RF tag) electronically programmed with unique information. However, it is understood that RFID systems may have more or less components based on the use requirements and the present invention is not limited to the RFID system comprising these components. The antenna may send out radio signals that activate the tag's electronics allowing data to be read and possibly written to the tag's electronically erasable programmable read-only memory (EEPROM). The antenna may be packaged with the transceiver and decoder to become an interrogator, typically called a reader even though it may write to writeable tags as well, although the present invention Is not limited in this respect. RFID tags may be read-only or read/write and may be read or written to through a variety of substances where barcodes or other optically read technologies would be useless. RFID tags may be categorized as either active or passive where passive tags may obtain power from the reader and operate without a separate external power source while an internal battery powers active tags.

Figure 3:
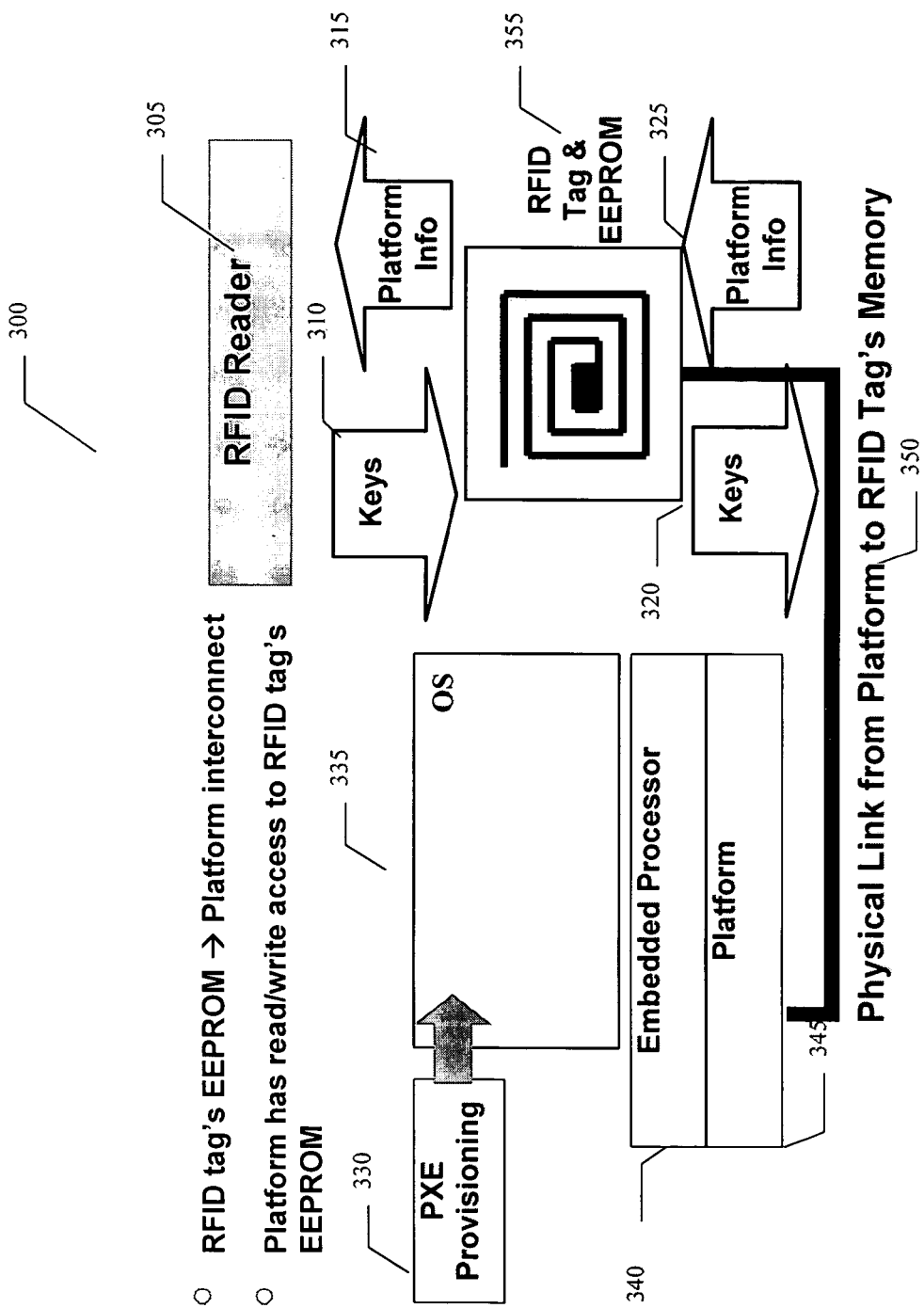
FIG. 3 is a diagram illustrating an RFID tag's EEPROM platform interconnect with the platform having read/write access to the RFID tag's EEPROM.

An embodiment of the present invention provides a system by which a passive read/write RFID tag may be incorporated within any platform, such as, but not limited to, a client or server. Furthermore, this passive RFID tag may be interfaced with the platform such that its EEPROM may also be read or written to from the platform using a wired serial connection. An embedded microcontroller with access to dynamic and non-volatile memory that may operate independently of a host processor and operating system (OS), with direct access to the network interface as well may be used. Although the present invention is not limited in this respect, a platform that provides such an embedded microcontroller could be a desktop Ethernet product designed and manufactured by Intel Corporation and is described in detail with reference to FIG. 3. However, it is understood that the Ethernet product of FIG. 3 is only an illustrative example and any communication means is anticipated to be within the scope of the present invention.

The RFID tag may be read from or written to by either a RFID reader or the platform via a direct serial connection to the embedded processor described above. The RFID tag may be switched into a serial read only mode, where the contents of the RFID tag's EEPROM may only be read back via the direct connection to the platform embedded processor and not the RFID reader. An RFID reader may set the contents of the RFID tag's EEPROM and then switch the RFID tag to the serial read only mode allowing the contents to be read by the embedded processor. This combination of technologies allows for wireless configuration and touchless provisioning of any platform via RFID technology.

Although not limited in this respect, an embodiment of the present invention may utilize PXE (Preboot Execution Environment) to facilitate touchless provisioning of a platform. PXE may allow for automatic device provisioning once the device has power and network connectivity. The initial process to get a device provisioned may use, although is not limited to, a PXE implementation on the device using PXE DHCP (Dynamic Host Configuration Protocol) to determine which PXE server to contact and a boot file name. The device may then contact that PXE server and the boot image may be transferred using TFTP (Trivial File Transfer Protocol). One concern with automatic configuration/provisioning may be security. PXE may use Boot Integrity Services (BIS) to validate the boot image. BIS uses both digital signatures (credentials) and public key cryptography to perform an integrity and authorization check. In an embodiment of the present invention, the PXE client must have a BIS-enabled BIOS in order to use BIS, however, the present invention is not limited to the PXE client having a BIS-enabled BIOS. The BIS-enabled client may request that the proper boot image credentials be downloaded from the PXE server as well. The administrator's public and private key pair may be generated and stored on the server. In an embodiment of the present invention, and not limited in this respect, before booting, the administrator's public key may be embedded in a digital certificate and stored on the client. In BIS, a digital certificate may include at least the client's public key, the server's public key and the digital signature (credential) of the certificate that is generated using the server's private key. Subsequently, the boot image may be executed only if the credentials supplied for the boot image match those in the digital certificate stored on the client.

An embodiment of the present invention provides that the integrated RFID tag may contain both an external passive RF interface as well as an internal serial system bus interface that may allow the device to talk directly to the tag. Further, the present invention is capable of storing information independently of the state of the host OS. The RFID tag of one embodiment of the present invention may be configured to accept commands only through system bus interface or via the RF interface as well. To allow for device configuration, an RFID reader may be used to write security keys as well as a PXE server address to the RFID tag and after this initial writing, the reader then may lock the tag from receiving any further RF interface commands. This restricts access to RFID tag information to the device itself. During preboot, the present invention may access this information using the direct serial bus interface to the integrated RFID tag and may copy it to memory on the device.

At this point, the device may contact the PXE (Preboot Execution Environment) server to obtain the required boot image. Once the device has configured the security keys, it may be erased from the RFID tag and the RF interface may be opened to allow other information such as device system description to be written to the RFID tag and made available to external RFID readers for the purpose of identifying a machine, its location, and its current configuration wirelessly, even when the machine is not powered.

Turning now to the figures, at FIG. 1, shown generally at 100, is an illustration of an apparatus, such as deployed server 140, configured using an embodiment of the present invention. RFID tag 107 may be coupled with the apparatus 140 and the RFID tag 107 enabling wireless provisioning and configuration of the apparatus 140 by interfacing with a RFID reader 130 capable of assigning security keys and PXE server address wirelessly 105. After security keys and PXE server address are assigned, the apparatus (e.g. server in one embodiment of the present invention) contacts 115 a PXE server 135 using the address and keys assigned by the RFID reader 130 to server 140. The operating system may then be installed and configured 120 in the server 140 by PXE server 135. At 125 the server 140 is now provisioned and services running and RFID tag 107 may provide RFID reader 130 with system identity and configuration.

Figure 2:
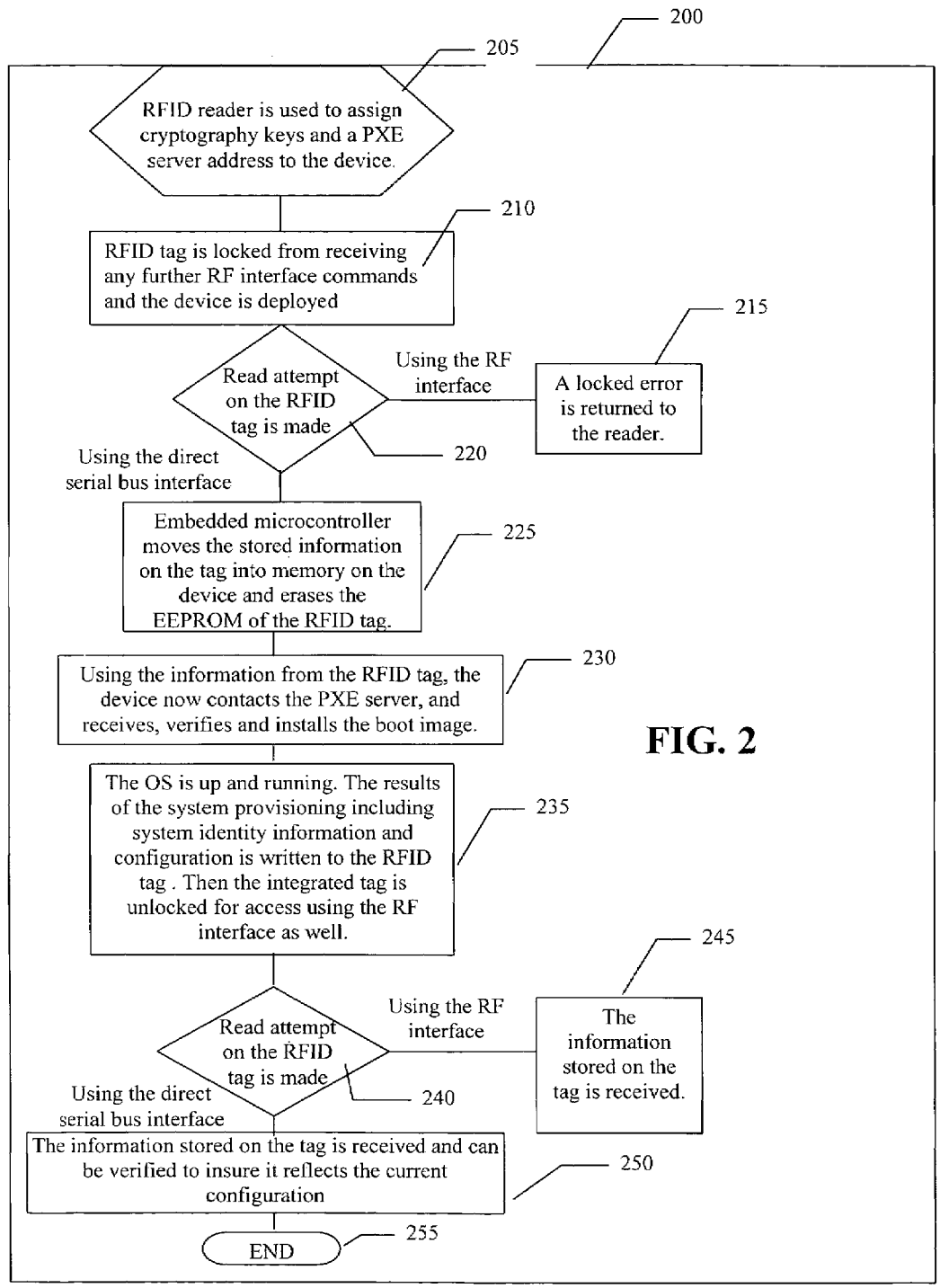
FIG. 2 is a flow chart for the process of one embodiment of the present invention.

Turning now to FIG. 2, illustrated generally at 200, is a flow chart for the process of one embodiment of the present invention. RFID reader 130 is used to assign cryptography keys and a PXE server address to the apparatus 140 at 205. At 210 the RFID tag may be locked from receiving any further RF interface commands and the apparatus 140 may be deployed. At 220 a read attempt on the RFID tag may be made and if RF is used, a locked error is returned to the reader at 215. If a read attempt is made using a direct serial bus interface, the embedded processor may move the stored information on the tag into memory on the device and erase the EEPROM of the RFID tag. However, the present invention is not limited in this respect. Then at 230, using the information from the RFID tag, the device may now contact the PXE server and verify and install the boot image. At 235, the operating system is up and running and the result of the system provisioning, including system identity information and configuration, is written to the RFID tag. The integrated tag is then unlocked for access using the RF interface as well.

Another read attempt may then be made at 240 and, if using RF, the information stored on the tag may be received at 245. If using the direct serial bus interface, the information stored on the tag may be received and may be verified to insure it reflects the current configuration. The process ends at 255.

Turning now to FIG. 3, illustrated generally as 300, is a diagram illustrating an RFID tag's EEPROM platform interconnect with the platform having read/write access to RFID tag's EEPROM. The RFID reader 305 may wirelessly store security keys 310 to the RFID tag's EEPROM 355. Platform 345 may by physically linked 350 from the platform 345 to the RFID tag's memory such as EEPROM 355. Although not limited in this respect, the RFID tag 355 (shown as 107 in FIG. 1) may be a passive read/write RFID tag and the apparatus 140 may be, although it is not required to be, a platform, such as a client or server. The physical link 350 from the platform 345 to the RFID tag's memory may be used by an embedded microcontroller 340 to access the stored security keys 320. The security keys 310, 320 may be used for PXE provisioning 330 to install an operating system 335. The embedded microcontroller 340 may also write platform information 325 to the RFID tag 355 using the physical link 350 from the platform to the RFID tag's EEPROM so that an RFID reader 305 may wirelessly read the platform information 315.

Yet another embodiment of the present invention provides an article comprising a storage medium having stored thereon instructions, that, when executed by a computing platform, results in wirelessly provisioning and configuring an apparatus by interfacing an RFID tag with the apparatus, the RFID tag enabling wireless provisioning and configuration of the apparatus, wherein the interfacing an RFID tag may be interfacing an RFID tag that is a passive read/write RFID tag.

Elaborating on an aforementioned embodiment, the present invention provides an apparatus, comprising: an RFID tag interfaced with said apparatus, said RFID tag enables wireless provisioning and configuration of said apparatus; and an embedded processor having direct access to said RFID tag. The embedded processor may have direct access to said RFID tag to provide enhanced security when dealing with contents of said RFID tag. The contents may include secret keys provisioned via said RF interface to the RFID tag which may be retrieved by the embedded processor which may operate on said secret keys and perform cryptographic functions on behalf of a local client/server or with remote systems over the network without disclosing the secret keys.

The secret keys may be kept private by the embedded processor thereby providing enhanced identity, data integrity, encryption/decryption, and authentication services and the embedded processor may draw minimal power and therefore remain on and connected while a local client/server host processor is in a sleep state or powered off, thereby allowing said embedded processor to provide information provisioned via said RFID Tag over a network interface to aid in location assistance of the system as well as providing asset information regarding the client/server to the network even when the system is powered off.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus platform, comprising:
  an RFID tag interfaced with said apparatus, said RFID tag enables wireless provisioning and configuration of said apparatus, wherein after an initial writing said reader then locks said RFID tag from receiving any further RF interface commands, thereby restricting access to RFID tag information to the platform itself.

2. The apparatus of claim 1, wherein said RFID tag is a passive read/write RFID tag.

3. The apparatus of claim 2, wherein said apparatus is a platform, such as a client or server.

4. The apparatus of claim 3, further comprising a wired serial connection to the RFID tag such that the tag's EEPROM can be read or written to from the platform.

5. The apparatus of claim 4, further comprising a host processor with an operating system (OS) and an embedded microcontroller, said embedded microcontroller with access to dynamic and non-volatile memory capable of operating independently of said host processor and OS and with direct access to a network interface, wherein said RFID tag is read from or written to by either a RFID reader or said platform via a direct serial connection to said embedded processor.

6. The apparatus of claim 5, wherein said RFID tag is capable of being switched into a serial read only mode after an RFID reader has set the contents of the RFID tag, where the contents of the RFID tag's EEPROM may only be read back via said direct connection to said platform embedded processor and not the RFID reader.

7. The apparatus of claim 6, wherein to allow for device configuration, said RFID reader is used to write security keys as well as a Preboot Execution Environment (PXE) server address to the RFID tag.

8. The apparatus of claim 7, wherein during a preboot, said platform accesses said RFID tag information using said direct serial bus interface to an integrated RFID tag and copies it to memory on said platform.

9. The apparatus of claim 8, wherein said platform is capable of contacting the PXE server to obtain a required boot image.

10. The apparatus of claim 9, wherein once said platform has been configured, security keys are erased from said RFID tag and an RF interface is opened to allow other information to be written to the RFID tag from said platform and made available to external RFID readers thereby allowing for identification of said platform, its location, and its current configuration wirelessly.

11. The apparatus of claim 5, wherein said apparatus is capable of storing information independently of the state of said host processor OS.

12. The apparatus of claim 3, further comprising an internal system bus interface that allows said platform to talk directly to said RFID tag.

13. The apparatus of claim 12, wherein said RFID tag contains both an external passive RF interface as well as an internal system bus interface that allows the device to talk directly to the tag.

14. The apparatus of claim 12, wherein said RFID tag is capable of being configured to accept commands only through said system bus interface or via the system bus interface and the RF interface.

15. A method of wirelessly provisioning and configuring an apparatus platform, comprising:
interfacing an RFID tag with said apparatus, said RFID tag enabling wireless provisioning and configuration of said apparatus, further comprising locking said RFID tag from receiving any further RF interface commands after an initial writing by said reader thereby restricting access to RFID tag information to the platform itself.

16. The method of claim 15, wherein said interfacing of an RFID tag is interfacing an RFID tag that is a passive read/write RFID tag.

17. The method of claim 16, wherein said apparatus is a platform, such as a client or server.

18. The method of claim 17, further comprising associating a RFID tag's EEPROM with said platform such that said RFID tag's EEPROM can be read or written to the platform using a wired serial connection.

19. The method of claim 18, further comprising embedding a microcontroller in a host processor with an operating system (OS), said embedded microcontroller with access to dynamic and non-volatile memory capable of operating independently of said host processor and OS and with direct access to a network interface, wherein said RFID tag is read from or written to by either a RFID reader or said platform via a direct connection to said embedded processor.

20. The method of claim 19, further comprising switching said RFID tag into a serial read only mode after an RFID reader has set the contents of the RFID tag, where the contents of said RFID tag's EEPROM can only be read back via said direct connection to said platform embedded processor and not the RFID reader.

21. The method of claim 20, further comprising interfacing an external passive RF interface and an internal system bus interface that allows a platform to talk directly to the tag.

22. The method of claim 20, further comprising configuring said RFID tag to accept commands only through said system bus interface or via the system bus interface and the RF interface.

23. The method of claim 19, further comprising using said RFID reader to write security keys as well as a Preboot Execution Environment (PXE) server address to the RFID tag to allow for device configuration.

24. The method of claim 23, further comprising accessing by said platform, during a preboot, RFID tag information using said direct serial bus interface to the integrated RFID tag and copying it to memory on said platform.

25. The method of claim 24, further comprising contacting, by said platform, a PXE server to obtain the required boot image.

26. The method of claim 25, further comprising erasing said security keys from said RFID tag and opening an RF interface to allow other information to be written to the RFID tag from said platform and making it available to external RFID readers thereby allowing for identification of said platform, its location, and its current configuration wirelessly.

27. The method of claim 18, further comprising interfacing an internal system bus that allows said platform to talk directly to said RFID tag.

28. The method of claim 18, further comprising storing information independently of the state of said host processor OS.

29. An article comprising a storage medium having stored thereon instructions, that, when executed by a computing platform, results in wirelessly provisioning and configuring an apparatus by interfacing an RFID tag with said apparatus, said RFID tag enabling wireless provisioning and configuration of said apparatus and locking said RFID tag from receiving any further RF interface commands after an initial writing by said reader thereby restricting access to RFID tag information to the platform itself.

30. The article of claim 29, wherein said interfacing an RFID tag is interfacing an RFID tag that is a passive read/write RFID tag.

31. The article of claim 30, wherein said apparatus is a platform, such as a client or server.

32. The article of claim 31, wherein said article further comprises controlling the associating of said RFID tag's EEPROM with said platform such that said RFID tag's EEPROM can also be read from or written to the platform using a wired serial connection.

33. The article of claim 32, wherein said article controls an embedded microcontroller in a host processor with an operating system (OS), said embedded microcontroller with access to dynamic and non-volatile memory capable of operating independently of said host processor and OS and with direct access to a network interface, wherein said RFID tag is read from or written to by either a RFID reader or said platform via a direct connection to said embedded processor.

34. The article of claim 33, wherein said article further controls switching said RFID tag into a serial read only mode after an RFID reader has set the contents of the RFID tag, where the contents of said RFID tag's EEPROM can only be read back via said direct connection to said platform embedded processor and not the RFID reader.

35. An apparatus platform, comprising:
an RFID tag interfaced with said apparatus, said RFID tag enables wireless provisioning and configuration of said apparatus; and
an embedded processor having direct access to said RFID tag apparatus, wherein after an initial writing said reader then locks said RFID tag from receiving any further RF interface commands, thereby restricting access to RFID tag information to the platform itself.

36. The apparatus of claims 35, wherein said embedded processor having direct access to said RFID tag provides enhanced security when dealing with contents of said RFID tag.

37. The apparatus of claim 36, wherein said contents include secret keys provisioned via said RF interface to the RFID tag which may be retrieved by the embedded processor which is capable of operating on said secret keys and performs cryptographic functions on behalf of a local client/server or with remote systems over a network without disclosing said secret keys.

38. The apparatus of claim 37, wherein said secret keys are kept private by the embedded processor thereby providing enhanced identity, data integrity, encryption/decryption, and authentication services.

39. The apparatus of claim 35, wherein said embedded processor draws minimal power and therefore remains on and connected while a local client/server host processor is in a sleep state or powered off.

* * * * *